United States Patent [19]
Gordon

[11] Patent Number: 6,102,707
[45] Date of Patent: Aug. 15, 2000

[54] EDUCATIONAL VEHICLE FOR EXPLORING AND VIEWING EARTH'S SURFACE

[76] Inventor: Michael D. Gordon, 4707 LaVilla Marina, Marina del Rey, Calif. 90292

[21] Appl. No.: 09/041,825

[22] Filed: Mar. 12, 1998

[51] Int. Cl.[7] ............................. G09B 25/06; A63H 33/00
[52] U.S. Cl. .............................................. 434/130; 446/29
[58] Field of Search ............................ 434/130; 446/29, 446/219; 280/87.01, 87.021, 87.042, 87.051, 775; 472/43

[56] References Cited

U.S. PATENT DOCUMENTS

| | | | |
|---|---|---|---|
| D. 207,785 | 5/1967 | Rockwell | D34/15 |
| 1,253,964 | 6/1918 | Hack | 52/143 |
| 4,767,334 | 8/1988 | Thorne et al. | 434/29 |
| 4,903,749 | 2/1990 | Hannania | 160/370.2 |
| 4,911,673 | 3/1990 | Hollowell | 446/219 |
| 5,037,156 | 8/1991 | Lundberg | 296/95.1 |
| 5,114,166 | 5/1992 | McCosher | 280/87.042 |
| 5,526,117 | 6/1996 | Fantone | 359/402 |
| 5,538,472 | 7/1996 | Panoushek et al. | 460/119 |
| 5,615,923 | 4/1997 | Madison | 296/95.1 |
| 5,666,227 | 9/1997 | Ben-Ghiath | 359/630 |

FOREIGN PATENT DOCUMENTS 904842  5/1986  Belgium .

*Primary Examiner*—Paul J. Hirsch
*Assistant Examiner*—Michael B. Priddy
*Attorney, Agent, or Firm*—W. Edward Johansen

[57] ABSTRACT

An educational vehicle for exploring and viewing earth's surface includes a body, a plurality of wheels, a transparent plate, a removable cover and a mirror assembly. A child sits on the body. The wheels are rotatively coupled to the body. The transparent plate mechanically coupled to the body. The transparent plate forms a window through which the child is able to explore and view the earth's surface. The transparent plate also forms a magnifying lens. The removable cover is placed over the transparent plate.

4 Claims, 4 Drawing Sheets

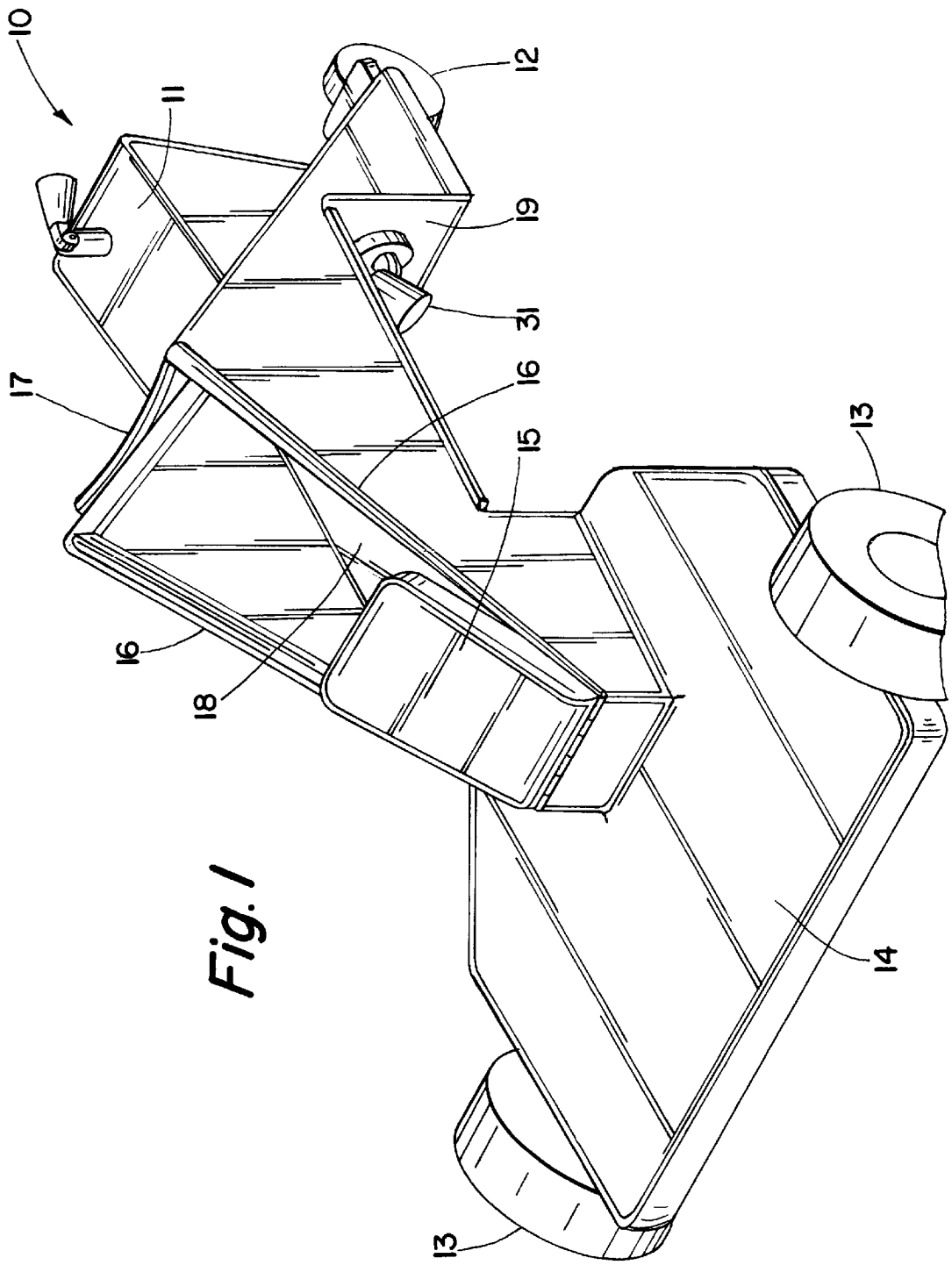

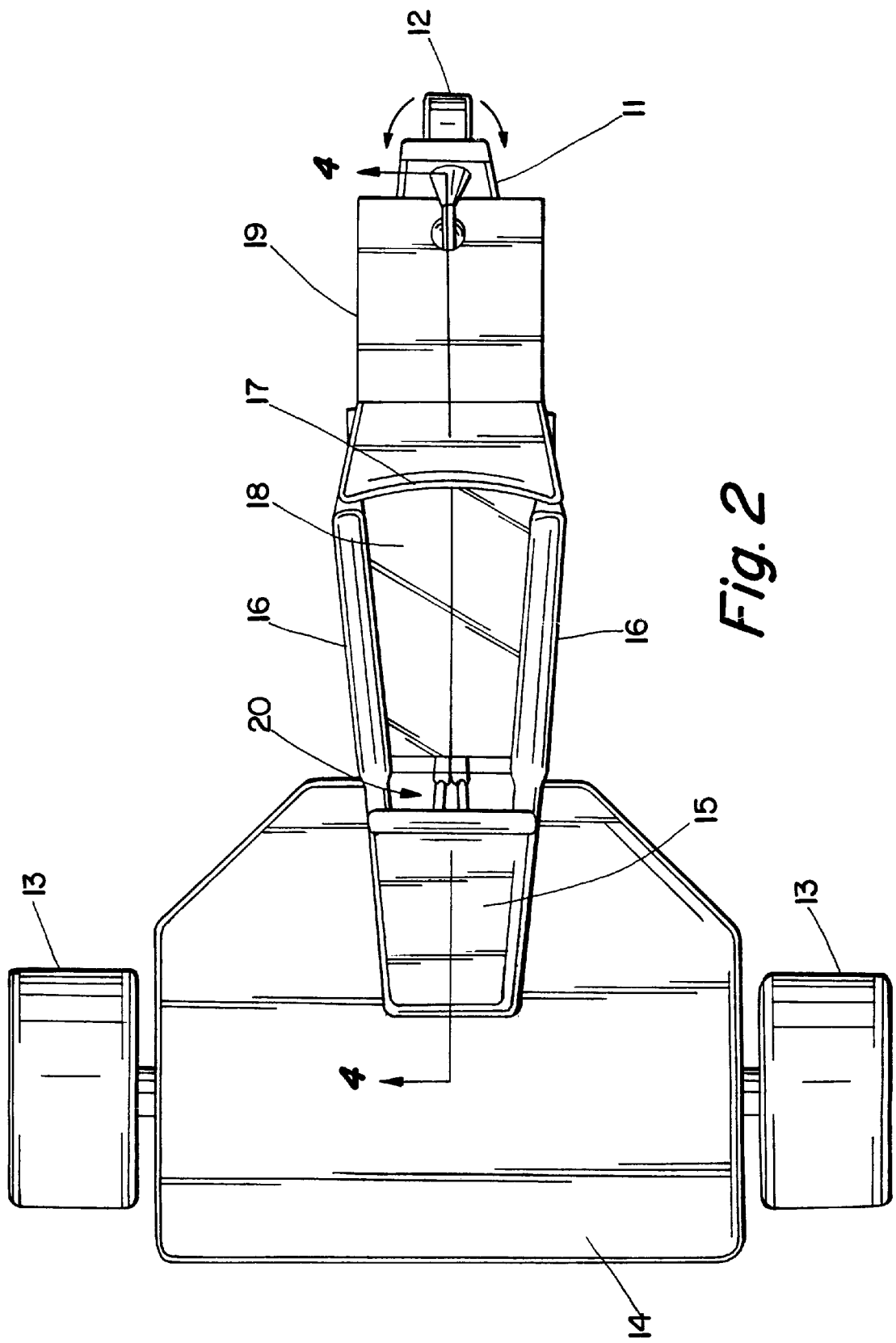

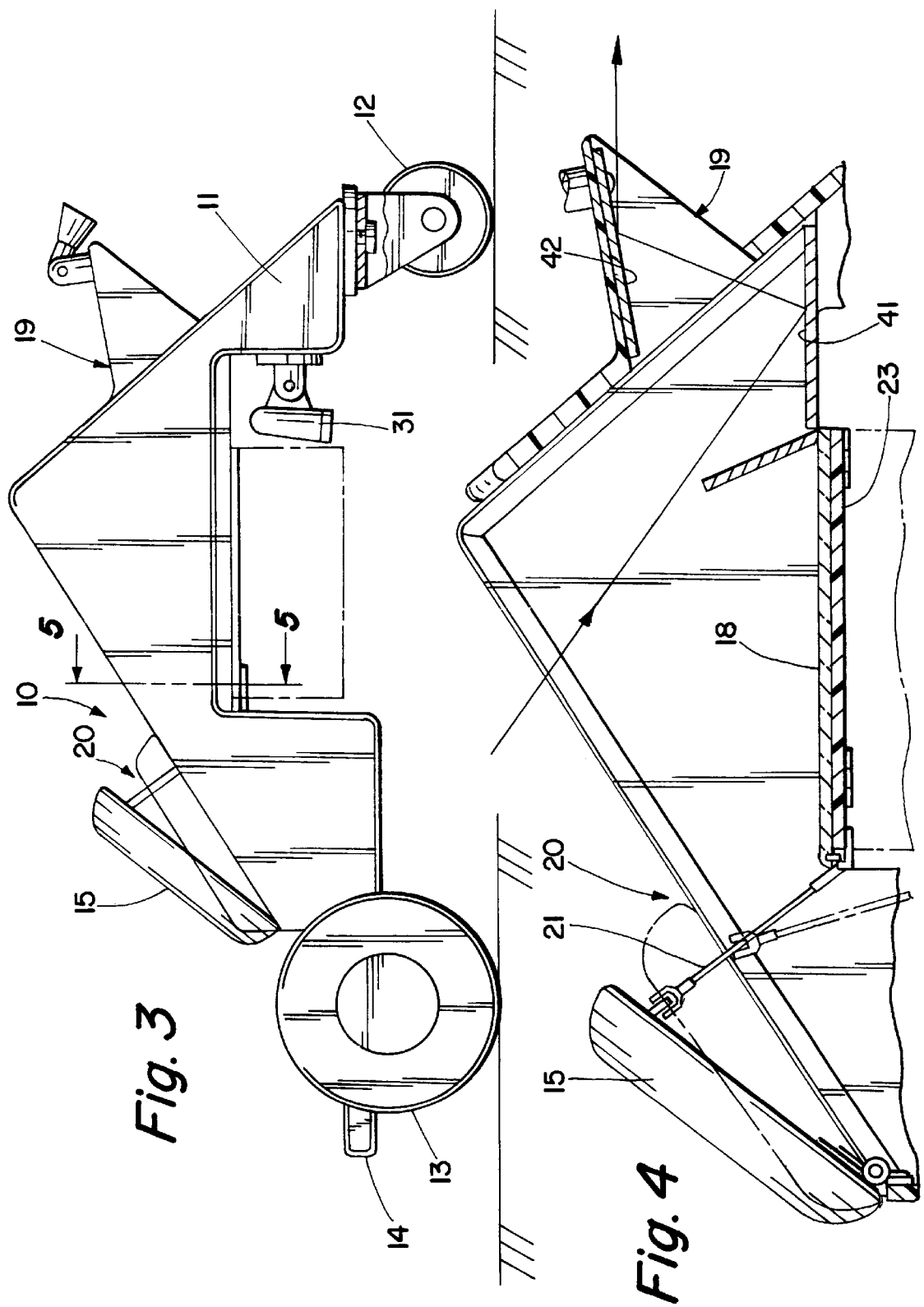

EDUCATIONAL VEHICLE FOR EXPLORING AND VIEWING EARTH'S SURFACE

BACKGROUND OF THE INVENTION

The invention is an educational vehicle for exloring and viewing earth's surface.

U.S. Pat. No. 5,526,177, teaches a dual-view, immersible periscope which is particularly suitable for use as a toy or learning tool in aquatic environments such as bath tubs, sinks, tidal pools and outdoor wadding pools where children play and explore. The periscope has an entrance aperture, an upper viewing compartment and a lower compartment. The upper compartment operates in air and the lower compartment contains the entrance aperture and floods with water when the periscope is immersed. The upper and lower compartments are separated from one another by a transparent window. The upper compartment surrounds and isolates its air space from the surrounding water in order to provide a completely still image of activity taking place beneath the surface even though it may be turbulent with wave action. Additional enhancements include magnification, underwater accessory lighting, sound effects, torpedo tubes, and means for placing transparencies over the entrance aperture to integrate images with underwater action.

U.S. Pat. No. 4,767,334 teaches a toy craft which is intended for both amusement and educational purposes. The toy craft is adapted to assume a plurality of distinctive craft forms. The toy craft includes a cocoon-like, full enclosure member which has an interior and an external attachment mechanism for the reception and detachment of sets of molded features. Each component of each of the sets is of a shape which, when in attachment with the enclosure member, gives the appearance of one of the distinctive craft forms. The enclosure member includes a first portion and a second portion and attachment members for releasably securing the first portion to the second portion. An access door forms a portion of the enclosure member and permits access between the outside of the enclosure member and the enclosure member interior, a seat within the enclosure member interior and fully adjustable with respect to the enclosure member. A foot control mechanism is adjustably secured to the floor of the enclosure member interior. A hand control mechanism is adjustably fixed within the interior of the full enclosure member. An external vision apparatus is secured to the top of the enclosure member and has a first end extending into the enclosure member interior and a second end extending away from the enclosure member. A plurality of attitudinal instruments provides attitudinal displays. The attitudinal instruments are within the enclosure member interior. The analog computer interacts with the foot control mechanism. The hand control mechanism and the attitudinal instruments operate together such that manipulation of the hand and foot control mechanism results in coordinated changes taking place in the attitudinal instruments. The fully enclosed toy craft is intended for both amusement and educational purposes and has the ability to assume a multitude of forms with each form resembling a different type of vehicle. The craft's interior resembles a scaled down version of a commander's cabin in a real craft and includes audio visual material, calculating apparatus and an assortment of readout or instrumentation devices. In addition, an analog computer interacting with various items in the commander's cabin, in response to stimuli provided by the operator moving hand or foot control devices gives the operator the illusion of being in control of a real craft.

U.S. Pat. No. 5,666,227, teaches a passive panoramic viewing system which affords panoramic forward, side, rear and underneath views to operators of a wide range of transportation mechanism which facilitates safe maneuvering thereof. The transportation mechanism includes private vehicles, full trailers, semi-trailers, busses, aircraft and ships.

U.S. Pat. No. 4,911,673 teaches a toy viewing assembly kit for producing multi-directional image reflecting configurations which includes a plurality of angular reflecting sections having reflecting elements disposed therein and hollow extension sections. The individual sections have coupling portions for permitting removable interconnection thereof. The coupling portions allow unrestricted axial rotations of adjacently connected sections thereby creating multi-directional assembly configurations. The assembly configurations provide multi-axis image reflections viewable by the child user.

Numerous devices are known in the art for reflecting an image of a viewed object. Such devices are commonly referred to as periscopes. However, periscope-type devices are generally rigidly constructed so as to restrict their directional image reflecting characteristics. Further, such devices utilize an optical lens for producing the desired optical reflection of a viewed object.

The novelty of the viewing assembly kit lies in its functional utility as a child's toy which is capable of random assembly configurations limited only by the imagination of the child user. The viewing assembly kit provides sectional components that can be randomly interconnected and rotated relative to each other so as to create multi-directional image reflecting configurations.

SUMMARY OF INVENTION

The present invention is generally directed to an educational device for exloring and viewing his environment. The educational device includes a body and a transparent plate. The transparent plate forms a window through which the child is able to explore and view his environment.

In a first separate aspect of the present invention, the educational device includes a plurality of wheels. The wheels are rotatively coupled to the body.

In a second separate aspect of the present invention, the transparent plate forms a magnifying lens.

In a third separate aspect of the present invention, the educational device includes a removable cover which is placed over the transparent plate.

In a fourth separate aspect of the present invention, the educational device includes a mirror assembly.

In a fifth separate aspect of the present invention, the educational device includes a lighting assembly.

Other aspects and many of the attendant advantages will be more readily appreciated as the same becomes better understood by reference to the drawings and the following detailed description.

The features of the present invention which are believed to be novel are set forth with particularity in the appended claims.

DESCRIPTION OF THE DRAWINGS

FIG. 1 is a perspective view of an educational vehicle for exloring and viewing earth's surface according to the present invention.

FIG. 2 is a top plan view of the educational vehicle for exloring and viewing earth's surface of FIG. 1.

FIG. 3 is a side elevational view of the educational vehicle for exloring and viewing earth's surface of FIG. 1.

FIG. 4 is an enlarged, partial side elevational view in cross-section of the educational vehicle for exloring and viewing earth's surface of FIG. 1 taken along the line 4—4 of FIG. 2.

DESCRIPTION OF THE PREFERRED EMBODIMENT

Figure 5:
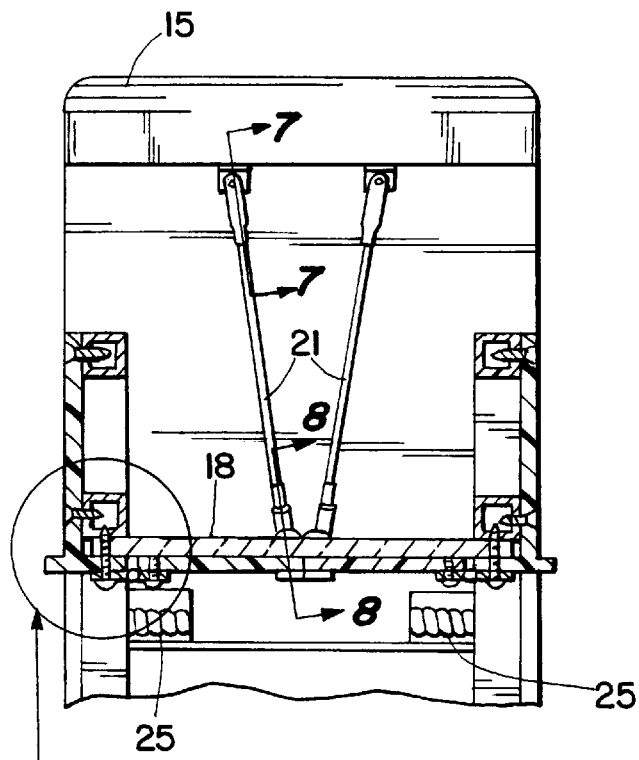
FIG. 5 is a cross-sectional view of the educational vehicle for exloring and viewing earth's surface of FIG. 1 taken along the line 5—5 of FIG. 3 with the removable cover closed.

Referring to FIG. 1 in conjunction with FIG. 2 an educational vehicle 10 for exloring and viewing earth's surface includes includes a body 11, a steerable front wheel 12 and two rear wheels 13. The body 11 includes a knee rest 14 which is disposed at the rear end of the body, a chest rest 15, two arm rests 16, a head rest 17, a transparent plate 18 and a viewing assembly 19 which is disposed at the front end of the body 11. The steerable front wheel 12 is rotatabley coupled to the body 11 adjacent to the viewing assembly 19 at its front end. The two rear wheels 13 are rotatably coupled to the body adjacent to the knee rest 14 at its rear end. When a child sits on the body 11, he places his knees on the knee rest 14, his chest on the chest rest 15, each of his arms on one of the two arm rests 16 and his head on the head rest 17. The transparent plate 18 is mechanically coupled to the body 11. The transparent plate 18 forms a window through which the child is able to explore and view the earth's surface. The transparent plate 18 also forms a magnifying lens.

Referring to FIG. 2 in conjunction with FIG. 3 and FIG. 4 the educational vehicle 10 also includes a plate covering mechanism 20. The plate covering mechanism 20 which covers the transparent plate 18 in order to shield it from the rays of the sun thereby protecting the educational vehicle 10 from heat damage.

Figure 7:
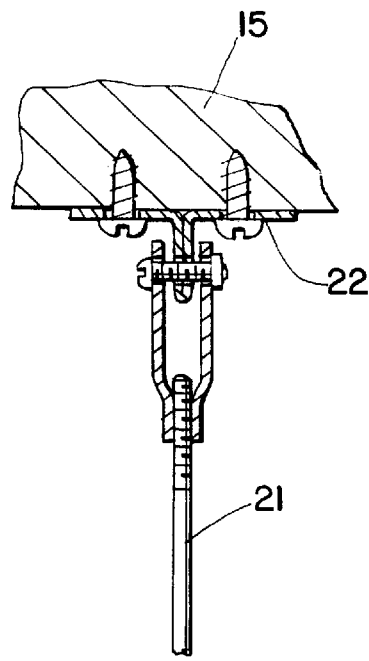
FIG. 7 is a cross-sectional view of the educational vehicle for exloring and viewing earth's surface of FIG. 1 taken along the line 7—7 of FIG. 6.
Figure 6:
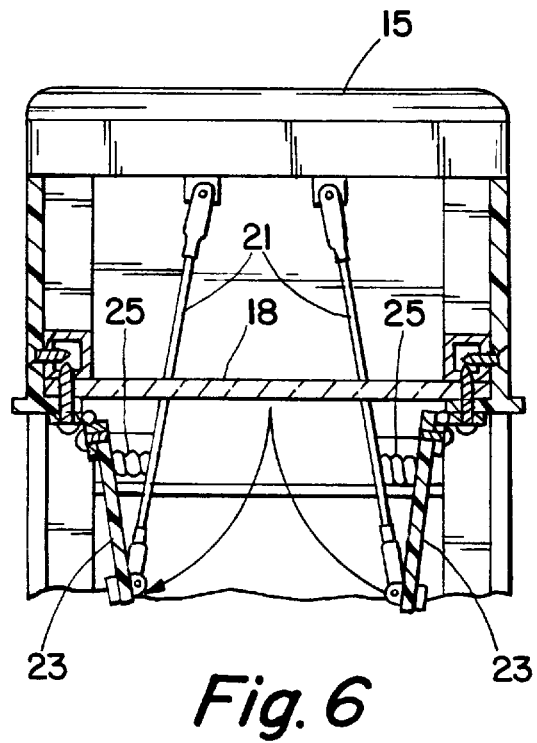
FIG. 6 is a cross-sectional view of the educational vehicle for exloring and viewing earth's surface of FIG. 1 taken along the line 5—5 of FIG. 3 with the removable cover opened.

Referring to FIG. 4 in conjunction with FIG. 5, FIG. 6 and FIG. 7 the plate covering mechanism 20 includes a two rods 21, two top rod mounts 22 and two removable covers 23. The plate covering mechanism 20 also includes two hinges 24, two coiled springs 25 and two bottom rod mounts 26. Each rod 21 is mechanically coupled to one of the top rod mounts 22 at its top end.

Figure 9:
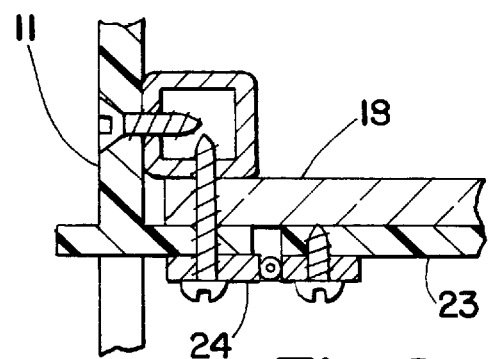
FIG. 9 is an enlarged, partial cross-sectional view of the educational vehicle for exploring and viewing earth's surface of FIG. 1 taken along the line 5—5 of FIG. 3 with the removable cover opened.
Figure 8:
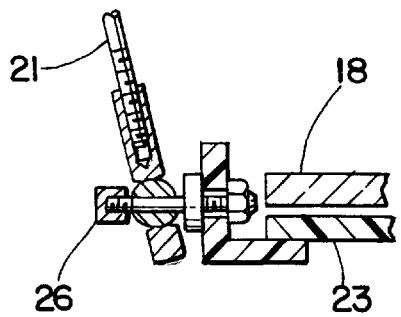
FIG. 8 is a cross-sectional view of the educational vehicle for exloring and viewing earth's surface of FIG. 1 taken along the line 8—8 of FIG. 6.

Referring to FIG. 5 in conjunction with FIG. 6, FIG. 8 and FIG. 9 each rod 21 is mechanically coupled to one the bottom rod mounts 26 at its bottom end. Each hinge 24 is mechanically coupled to the body adjacent to one of the side edges of the transparent plate 18. Each removable cover 23 is mechanically coupled to one of the hinges 24. Each coiled spring 25 resiliently biases one of the hinges 24.

Referring to FIG. 1 in conjunction with FIG. 2 and FIG. 3 the educational vehicle 10 also includes a first lighting assembly 31 and a second lighting assembly 32. The first lighting assembly 31 is disposed adjacent to the steerable wheel 12 and mechanically coupled to the body 11 at its front end. The child uses the first lighting assembly 31 to illuminate the earth's surface. The second lighting assembly 32 is disposed adjacent to the viewing assembly 19 and mechanically coupled to the body 11 at its front end. The child uses the second lighting assembly 32 to guide him as travels along the earth's surface.

Referring to FIG. 1 in conjunction with FIG. 2, FIG. 3 and FIG. 4 the viewing assembly 19 includes first mirror 41 and a second mirror 42. The first and second mirrors 41 and 42 combine to form the viewing assembly 19 so that the child can view the earth's surface as he travels along it.

From the foregoing it can be seen that an educational vehicle for exloring and viewing earth's surface has been described. Accordingly it is intended that the foregoing disclosure and drawings shall be considered only as an illustration of the principle of the present invention.

What is claimed is:

1. An educational vehicle for use by a child for exloring and viewing earth's surface, said educational vehicle comprising:

a. a body on which the child sits;

b. a plurality of wheels rotatively coupled to said body; and c. a transparent plate mechanically coupled to said body wherein said transparent plate also forms a magnifying lens whereby said transparent plate forms a window through which the child is able to explore and view the earth's surface.

2. An educational vehicle according to claim 1 wherein said educational vehicle includes a removable cover which is placed over said transparent plate.

3. An educational vehicle according to claim 1 wherein said educational vehicle includes a mirror assembly.

4. An educational vehicle according to claim 1 wherein said educational vehicle includes a lighting assembly.

* * * * *